Figure 1:
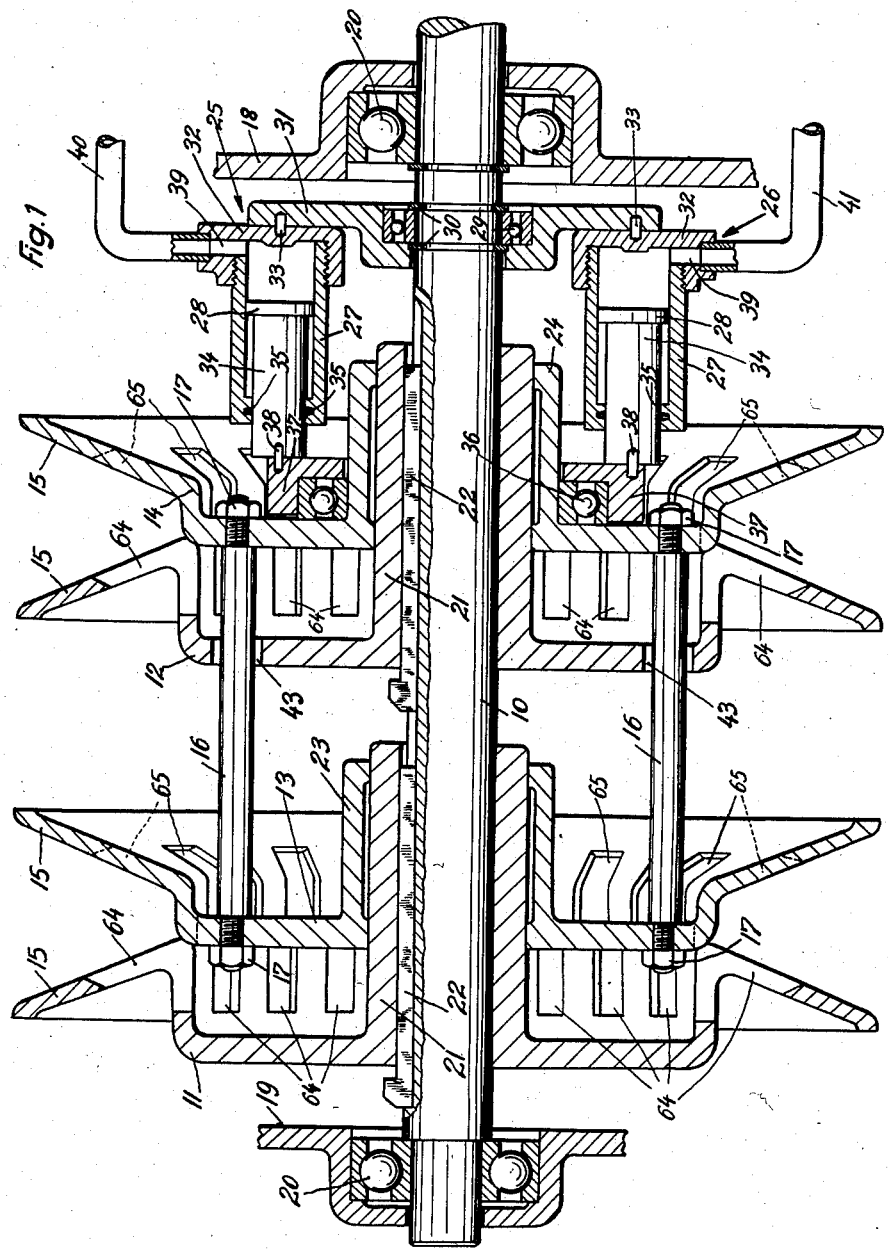

May 26, 1959

A. CLAAS 2,887,893

VARIABLE SPEED TRANSMISSION AND VARIABLE PITCH PULLEY THEREFOR

Filed Nov. 22, 1955

3 Sheets-Sheet 1

Inventor
August Claas
By Richards & Geier
ATTORNEYS

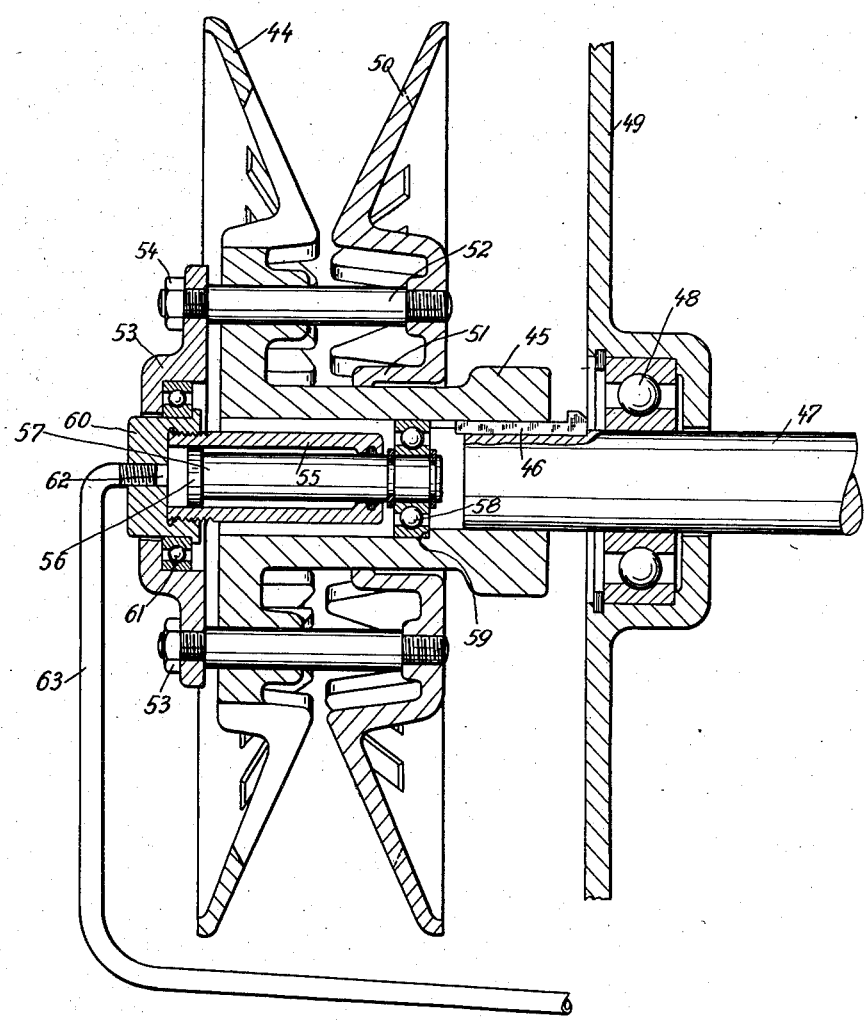

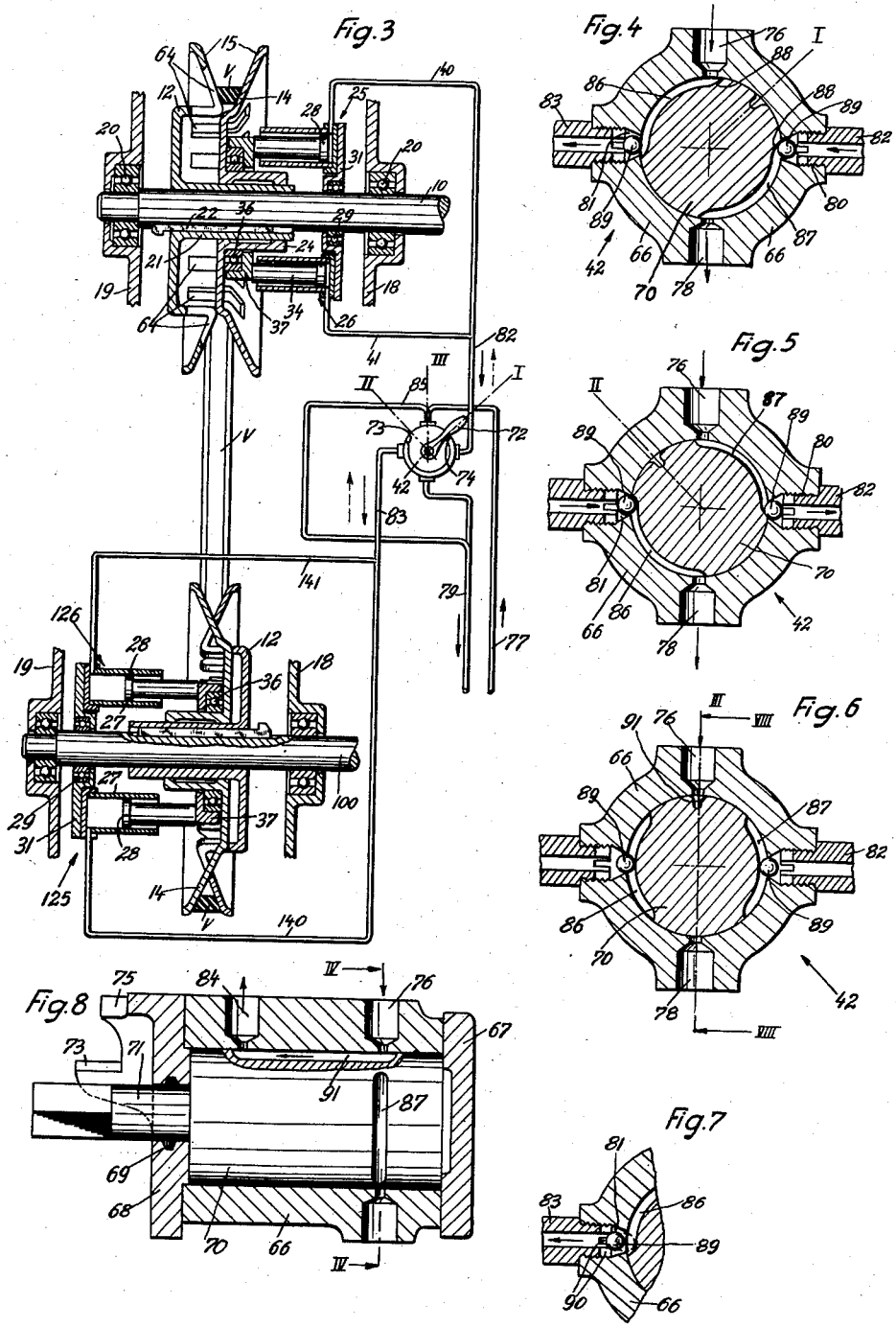

United States Patent Office 2,887,893
Patented May 26, 1959

2,887,893

VARIABLE SPEED TRANSMISSION AND VARIABLE PITCH PULLEY THEREFOR

August Claas, Harsewinkel, Westphalia, Germany

Application November 22, 1955, Serial No. 548,463

Claims priority, application Germany December 6, 1954

7 Claims. (Cl. 74—230.17)

This invention relates to a variable speed transmission, particularly to a transmission employing one or more V-belts, and to a variable pitch pulley for such transmission.

It is an object of this invention to provide a variable speed transmission of simple and rugged construction. Further objects of this invention are to provide a variable V-belt transmission in which the maintenance of a proper tension of the belts is ensured during variation of the ratio of transmission; in which the effective diameters of the pulleys are uniformly and positively varied, and in which the ratio of transmission may be changed by simple manipulation of a lever requiring a minimum of effort and attention.

Further objects of the present invention will appear from a detailed description of a number of embodiments thereof which are illustrated in the accompanying drawings, it being understood that such description serves the purpose of illustrating the invention rather than that of restricting or limiting the same. In the drawings:

Fig. 1 is an axial section of a variable pitch pulley for a multiple V-belt drive equipped with a plurality of fluid-operable actuating units, Fig. 2 is an axial section of a variable pitch pulley for a single V-belt equipped with a single fluid-operable actuating unit, Fig. 3 is an axial section through a variable speed transmission composed of variable pitch pulleys and a single V-belt, each equipped with a plurality of fluid-operable actuating units controlled by a common valve, the housing being shown broken away, Fig. 4 is a transverse section taken through the valve shown in Fig. 3, the valve being in position for reducing the ratio of transmission, the section being taken along the line IV—IV of Fig. 8, Fig. 5 is a sectional view of the valve similar to that of Fig. 4 showing the valve in position for increasing the ratio of transmission, Fig. 6 is a sectional view of the valve similar to that of Fig. 4 showing the valve in position for maintaining the ratio of transmission set up, Fig. 7 is a partial view of Fig. 4 on an enlarged scale illustrating the check valve provided in one of the ports of the control valve, and Fig. 8 is an axial section taken through the control valve, the section being taken along the line VIII—VIII of Fig. 6.

The variable pitch pulley illustrated in Fig. 1 which is adapted to cooperate with a pair of V-belts comprises a shaft 10, a set of stationary conical disks 11 and 12, a set of slidable conical disks 13 and 14 carried by the shaft 10, and means for clamping the slidable disks 13 and 14 together. Each disk is provided with a conical face 15 and the disks are so mounted on the supporting shaft 10 that the faces 15 are in opposed relationship. In the embodiment shown in Fig. 1, the means for clamping the slidable disks 13 and 14 together are formed by a plurality of spacer elements, such as rods 16, which connect the slidable conical disks 13 and 14 at a plurality of circumferentially distributed points. The rods 16 have threaded ends of reduced diameter extending through bores of the slidable disks 13 and 14 and carrying nuts 17, whereby the slidable disks will be connected to constitute a rigid unit. The rods 16 extend through openings 43 provided in the stationary disk 12.

Each of the disks 11, 12, 13 and 14 comprise a plane annular plate adjoining the hub portion 21, or 23 respectively, and a cylindrical section which connects the periphery of the plane plate with the inner periphery of the conical section. For the purpose of permitting the disks to be moved to relative positions in which their profiles intersect, the stationary disks are provided with wide radial slots 64 extending through the internal zones of the conical sections and through the cylindrical sections thereof, and the slidable disks are provided with similar slots 65 likewise extending through the internal zones of the conical sections and through the cylindrical sections thereof. The slots 64 of the stationary disks register with the lands of the slidable disks laterally confined by the slots 65.

The shaft 10 is journalled in a suitable support, for instance in the walls 18 and 19 of the housing of the transmission by means of anti-friction bearings 20. The disks 11 and 12 have hub portions 21 fixed to the shaft 10, for instance by keys 22, whereas the disks 13 and 14 have hubs 23 and 24 which are slidable on the hub portion 21 and secured against relative rotation thereto by suitable splines not shown.

Thus, it will appear that each pair of disks, such as 11, 13 or 12, 14, is mounted on the supporting shaft 10 for common rotation and relative axial displacement. The displacement changes the spacing of the conical faces 15 and the consequent position of a V-belt not shown which engages the conical faces 15.

In the embodiment illustrated in Fig. 1, a pair of fluid-operable units 25 and 26 is provided for effecting such displacement. Each unit is composed of a cylinder element 27 and of a piston element 28. The axis of the units 25 and 26 extends in the direction of the axial displacement of the disks 13 and 14. Moreover, means including anti-friction bearings are provided for connecting one of the elements 27, 28 in non-rotating condition with one set of disks and for connecting the other one of the elements 27, 28 in non-rotating condition with the other set of disks. In the embodiment shown in Fig. 1, the cylinder elements 27 are connected with the stationary disks 11, 12 and the piston elements 28 are connected with the set of slidable disks 13, 14. For this purpose, the shaft 10, on which the stationary disks 11 and 12 are fixed, is provided with a ball bearing 29 having its inner race secured against axial displacement by a pair of split rings 30, the outer race carrying a plate 31 to which cup-shaped cylinder heads 32 are suitably secured by pins 33, the cylinders 27 engaging internal threads of such cylinder heads. The pistons 28 are integral with piston rods 34 which extend out of the cylinders 27 and cooperate with sealing rings 35 provided therein.

The hub portion 24 of the slidable disk 14 carries the inner race of an anti-friction bearing 36, the outer race of which supports an annular member 37. This member is secured to the pistons 34 by means of pins 38. The cylinder heads 32 have ports 39 for the admission and discharge of a fluid under pressure, such as oil, supplied from a suitable pump through conduits 40 and 41.

The operation is as follows:

The V-belts running under tension in the grooves constituted by the conical faces 15, 15 tend to urge the disks 11 and 13 apart and, similarly, to urge the disks 12 and 14 apart. As the disks 11 and 12 are stationary in the sense that they cannot be displaced in axial direction, the thrust exerted by the V-belts on the two sets of disks is taken up by the shaft 10 and by the bearing 36 and transmitted by the latter through the annular member 37 and the piston rods 34 to the pistons 28 and by means of the fluid under pressure normally entrapped between the pistons 28 and the cylinder heads 32 to the latter and to the plate 31. Thus, the thrust transferred by plate 31 through ball bearing 29 on the shaft 10 is balanced by the thrust transferred by the keys 22 to the shaft 10 in the opposite direction. Hence, no axial thrust will be transferred upon the ball bearings 20.

The ducts 40 and 41 are connected to a control valve, such as a valve 42, which will later be described with reference to Figs. 3 to 8. The control valve may be set to different positions. In its normal position, it will close the conduits 40 and 41 to entrap the fluid under pressure between the pistons 28 and the cylinder heads 32 thus maintaining the two sets of disks in their relative axial position against the thrust exerted by the V-belts. In another position, the valve will permit the entrapped fluid under pressure to escape thereby permitting the set of slidable disks 13 and 14 to be shifted to the right with reference to Fig. 1 until the valve is closed again, whereby the grooves accommodating the V-belts are widened and the effective diameter of the variable pitch pulley is reduced accordingly. In a third position of the control valve, fluid under pressure is admitted into the cylinder heads 32 urging the pistons 28 to the left, whereby the effective diameter of the variable pitch pulley is increased.

Whereas a pair of fluid-operable actuating units 25 and 26 is shown in Fig. 1, any desired number of such actuating units may be provided. These units are uniformly distributed around the shaft 10 at equal radial distances therefrom to thereby exert a uniformly distributed pressure upon the annular member 37.

From the foregoing description it will appear that owing to the provision of the anti-friction bearings 29 and 36, the fluid-operable actuating units will not partake in the rotation of the two sets of conical disks, but will remain stationary, being held against rotation by the pipes 40 and 41. This has the advantage that the actuating units may be effectively sealed against high internal fluid pressure which would be extremely difficult if the actuating units would revolve.

While in the embodiment illustrated in Fig. 1 each set of disks comprises but two disks, any desired number of disks may be included in each set depending on the number of V-belts to be employed.

The embodiment illustrated in Fig. 2 differs from that described hereinabove primarily by the provision of the variable pitch pulley with a single fluid-operable unit disposed coaxially with respect to the disks. The conical disk 44 is provided with a hub portion 45 fixed by a key 46 to the end of the shaft 47 which is journalled by a ball bearing 48 in a supporting frame plate 49. The conical disk 50 has a hub portion 51 which surrounds the hub portion 45 and is axially slidable thereon. Both disks are connected for common rotation by a plurality of rods 52 which are screwed into tapped bores of disk 50 and extend parallel to shaft 47 being uniformly distributed around the shaft at equal radial distances therefrom. The rods 52 extend slidably through bores provided in the disk 44 and their threaded ends of reduced diameter extend through an annular plate 53 and are fixed thereto by nuts 54. Thus, the plate 53 constitutes a rigid unit with the slidable conical disk 50. The actuating unit, which is disposed coaxially with respect to the disks 44, 50 within the bore of the hub portion 45, comprises a cylindrical element 55 and a piston 56 movable therein. Here again means including anti-friction bearings are provided for connecting one of the elements in non-rotating condition with one of the disks 44, 50 and for connecting the other one of the elements of the actuating unit in non-rotating condition with the other disk. In the embodiment shown, the piston 56 has a piston rod 57 extending out of the cylinder 55 and carrying the inner race of a ball bearing 58, such inner race being secured against axial displacement on the piston rod by a pair of split rings engaging peripheral grooves of the piston rod. The outer race of the ball bearing engages an internal shoulder 59 of the hub portion 45 and is held in engagement therewith by axial thrust.

The cylinder element 55 has a cylinder head 60 in threaded engagement therewith carrying the inner race of a ball bearing 61, the outer race of which is seated in a suitable recess of plate 53. The cylinder head 60 has a port 62 connected by a pipe 63 with a control valve not shown. The thrust exerted by the V-belt which tends to move the disks 44 and 50 apart is transferred to cylinder head 60 and piston 56 and taken up by the fluid under pressure entrapped within the cylinder 55 between the piston 56 and the cylinder head 60. When the control valve is operated to permit discharge of the fluid under pressure, the cylinder head 60 will move to the right relative to piston 57 thus permitting the disk 50 to increase its distance from disk 44, whereby the effective diameter of the variable pitch pulley will be reduced. The admission of fluid under pressure to the port 62 has the opposite effect.

The variable speed transmission illustrated in Fig. 3 comprises two parallel shafts 10 and 100 each mounted by anti-friction bearings 20 in a suitable support, such as the walls 18, 19 of a transmission housing not shown in detail. A variable pitch pulley is mounted on each shaft. The pitch pulley on shaft 10 is similar to that described hereinabove with reference to Fig. 1 differing therefrom solely by the omission of the pair of disks 11, 13. A detailed description of this pulley is, therefore, believed to be dispensable. However, the same reference numerals employed in the description of Fig. 1 are inserted in Fig. 3 to facilitate the understanding thereof on the basis of the detailed explanations given hereinabove with reference to Fig. 1.

The variable pitch pulley mounted on shaft 100 is of the same general design as that on shaft 10, but is reversed with respect thereto so that the two actuating units 125 and 126 are disposed at the left. Here again the same reference numerals as used in Fig. 1 are applied to facilitate an understanding of the structure of the variable pitch pulley, except for the substitution of numerals 140 and 141 for 40 and 41 respectively.

The V-belt V engages the two variable pitch pulleys on shafts 10 and 100. The control valve 42 will now be described. It comprises a cylindrical housing 66 closed by end plates 67 and 68, the latter having a central bore and a sealing ring 69 therein. The valve further comprises a valve member 70 which is rotatably mounted in the valve housing 66 and has a stem 71 extending through the cover plate 68 and being provided with a handle 72 for manipulation. The cover plate 68 has a flange providing end stops 73 and 74 for cooperation with the handle 72. When the handle 72 engages one or the other of these stops it will be in the position I, or II respectively, indicated in Fig. 3. Resilient detent means are provided to arrest the handle in the central position III, for instance in form of a recess 75 provided in the flange of plate 68, such recess being adapted to receive handle 72, the handle being sufficiently resilient to permit the operator to lift it out of the recess 75 when desired.

The housing 66 is provided with an inlet port 76 for the admission of a fluid under pressure supplied through a conduit 77 from a suitable source of pressure fluid not shown, with an outlet port 78 for the discharge of fluid through a return pipe 79 leading back to the sump of the pump, and with a pair of opposite control ports 80 and 81, one of which is connected by a pipe 82 with the ducts 40, 41 and the other one is connected by a pipe 83 with the ducts 140 and 141.

The four ports 76, 78, 80 and 81 are disposed in a common plane IV—IV and are spaced 90° apart from one another. The control ports 80 and 81 are disposed in diametrically opposite relationship and the ports 76 and 78 are likewise disposed in diametrically opposite relationship. The housing 66 is provided with a second discharge port 84 connected by a pipe 85 with the discharge pipe 79.

The cylindrical valve member 70 is provided with a pair of opposite grooves 86, and 87 respectively, extending in the plane IV—IV and embracing an angle of about 90°, end faces 88 of the grooves extending at an acute angle to the radius of the valve member thereat. Each control port 80 or 81 is tapering inwardly, as shown in Fig. 7, and accommodates a spherical valve member 89 constituting a check valve. This valve member is so dimensioned that it may protrude out of the port into the associated groove 86, or 87 respectively, at the same time engaging the conical wall of the port in a sealing fashion, this position being shown in Fig. 7 by dotted lines, or, alternatively, may assume the position shown in full lines in which it engages the end of pipe 83 provided with slots 90.

Moreover, the valve member 70 is provided with an axially extending groove 91 having one of its ends extending through the lane IV—IV between the grooves 86 and 87 and spaced therefrom, and having its other end extending through the transverse plane in which port 84 is located.

The operation is as follows:

When the handle 72 is adjusted to the position III, the check valves 89 assume the position shown in dotted lines in Fig. 7 and thus seal the ducts 82, 40, 41 and 83, 140, 141 extending to the actuating units 25, 26 and 125, 126. Consequently, the slidable disks 14 are locked against axial displacement. When the operator wishes to reduce the ratio of transmission from shaft 10 to shaft 100, he must move handle 72 to the position shown in Fig. 4 thereby admitting fluid under pressure from the pump via pipe 77, port 76, groove 86, check valve 89, slots 90, pipe 83, and pipes 140, 141 to the actuating units 125, 126. The fluid under pressure tends to move pistons 28 of units 125, 126 outwardly to thereby shift slidable disk 14 to the right thus tending to reduce the width of the variable pitch pulley on shaft 100 increasing the effective diameter thereof. The pump is provided with a relief valve keeping the pressure produced within such limits that the pressure exerted by the actuating units 125 and 126 will maintain the V-belts V under the required tension.

The end face 88 of groove 87 engages the check valve member 89 in port 80 slightly lifting the same from the conical walls of the port and thereby permitting the fluid under pressure entrapped in the units 25 and 26 to escape via pipes 40, 41 and 82, port 80, groove 87, port 78, and pipe 79. Therefore, the thrust exerted by the V-belt V upon the slidable disk 14 on shaft 10 will move the slidable disk and the pistons 28 connected thereto for common displacement to the right, whereby the effective diameter of the variable pitch pulley on shaft 10 is reduced. When the ratio of transmission has been reduced to the desired degree, the operator will turn handle 72 to the position III, thereby permitting both check valves 89 to close. Moreover, groove 91 will now establish a communication between the ports 76 and 84 thus connecting the pressure pipe 77 with the discharge pipe 79 whereby the pump is relieved from pressure.

When the operator wishes to increase the ratio of transmission from shaft 10 to shaft 100, he will turn handle 72 to the position II thereby moving the valve member 70 to the position shown in Fig. 5 in which the communication between ports 76 and 84 is interrupted permitting the pump to build up pressure in port 76 wherefrom the fluid under pressure will flow through groove 87, port 80 and pipes 82, 40 and 41 to the actuating units 25 and 26. These actuating units will move slidable disk 14 to the left thus increasing the effective diameter of the variable pitch pulley on shaft 10. At the same time the check valve in port 81 will be lifted from its seat by engagement with the end wall of groove 86 permitting the liquid under pressure to escape from the actuating units 125 and 126 through pipes 140, 141 and 83, port 81, groove 86, port 78 and discharge pipe 79. Therefore, the thrust exerted by the V-belt V on the slidable disk 14 on shaft 100 will permit such slidable disk to move to the left, whereby the effective diameter of the pulley on shaft 100 is reduced.

Hence, it will appear that the control valve constitutes a settable means common to both of the fluid-operable units, such as 25 and 125, for simultaneously admitting a fluid under pressure to one of these units and discharging fluid from the other one of the units, and vice versa.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A variable pitch pulley adapted to cooperate with a V-belt, comprising a support, a pair of disks each provided with a conical face, means for mounting said disks with said faces in opposed relationship on said support for common rotation and relative axial displacement, a fluid-operable unit composed of a cylinder element and of a piston element, the axis of said unit extending in the direction of said axial displacement, means including an anti-friction bearing for connecting one of said elements in non-rotating condition with one of said disks, means including an antifriction bearing for connecting the other one of said elements in non-rotating condition with the other one of said disks, and means for controlling the admission and discharge of a fluid to and from said unit, said pulley further comprising a shaft journalled in said support, one of said disks having a hub portion fixed to said shaft and the other one of said disks being slidably mounted on said hub portion, said piston element being connected in non-rotating condition by one of said anti-friction bearings to said hub portion and said cylinder element being connected in non-rotating condition by the other one of said anti-friction bearings with said other one of said disks, said hub portion having an axial bore accommodating said unit.

2. An apparatus for controlling the admission and discharge of fluid to and from a fluid operated unit of a variable pitch pulley, said apparatus comprising a valve composed of a valve housing having an inlet port for the admission of fluid under pressure, an outlet port for the discharge of fluid, and a control port, and a valve member in said housing adapted to be moved to different positions and having a recess adapted in one of said positions to connect said control port to said inlet port and in another one of said positions to connect said control port to said discharge port, and a duct connecting said control port to said fluid-operable unit, said control port of said valve housing having a check valve mounted to open outwardly and adapted to engage said recess and to be opened either by pressure fluid admitted to said recess through said inlet port or by engagement with the end wall of said recess.

3. A device for use in a variable speed transmission for simultaneously admitting a fluid under pressure to a fluid operated unit and discharging fluid from another fluid operated unit, and vice versa, said device comprising a valve having a valve housing and a recessed valve member movably mounted therein for adjustment into different positions, said housing being provided with an inlet port for the admission of a fluid under pressure, with an outlet port for the discharge of fluid, and with a pair of control ports, a duct for connecting one of said control ports to one of said units, and a duct for connecting the other one of said control ports to the other one of said units, said valve member in one of said positions connecting one of said control ports to said inlet port and the other one of said control ports to said outlet port and in another one of said positions exchanging said connections between said control ports and said inlet port and said discharge port and in a third position interrupting any communication between said ports, said housing comprising a second discharge port, said valve member in said third position connecting said inlet port with said second discharge port.

4. A device as claimed in claim 3 in which said control ports are provided with outwardly opening check valves which in closed condition engage recesses of said member and are thereby adapted to be opened either by actuation of said member or by fluid under pressure.

5. A device as claimed in claim 4 in which each of said check valves is a ball, each of said control ports being formed with an outwardly flaring conical wall constituting a seat for said ball and with spaced stops limiting outward displacement of said balls.

6. A variable pitch pulley for a V-belt, said pulley comprising a shaft, at least one conical disk having a hub portion fixed to said shaft, at least one conical disk slidably mounted on said hub portion, the conical faces of said disks being in opposed relationship, whereby said disks are mounted for common rotation and relative axial displacement, at least one fluid-operable unit composed of a cylinder element and of a piston element, the axis of said unit extending in the direction of said axial displacement, means including an anti-friction bearing connecting one of said elements in non-rotating condition to said hub portion, and means including an anti-friction bearing connecting the other one of said elements in non-rotating condition to the other one of said disks.

7. A variable pitch pulley for a V-belt, said pulley comprising a shaft, at least one conical disk having a hub portion fixed to said shaft, at least one conical disk slidably mounted on said hub portion, the conical faces of said disks being in opposed relationship, whereby said disks are mounted for common rotation and relative axial displacement, at least one fluid-operable unit composed of a cylinder element and of a piston element, the axis of said unit extending in the direction of said axial displacement, means including an anti-friction bearing connecting one of said elements in non-rotating condition to said hub portion, means including an anti-friction bearing connecting the other one of said elements in non-rotating condition to the other one of said disks, and means connected with the last-mentioned means for supporting said fluid-operable unit in spaced circumferential relationship to said shaft.

References Cited in the file of this patent

UNITED STATES PATENTS

| | | |
|---|---|---|
| 1,035,860 | Conradson | Aug. 20, 1912 |
| 1,348,123 | Muth | July 27, 1920 |
| 2,112,141 | Clay | March 22, 1938 |
| 2,135,467 | Metz | Nov. 1, 1938 |
| 2,198,940 | Heyer et al. | April 30, 1940 |
| 2,262,678 | Heyer | Nov. 11, 1941 |
| 2,295,161 | Clay | Sept. 8, 1942 |
| 2,342,880 | Masek | Feb. 29, 1944 |

FOREIGN PATENTS

| | | |
|---|---|---|
| 577,636 | Great Britain | May 27, 1946 |